(12) United States Patent
McDuffie

(10) Patent No.: US 7,075,038 B2
(45) Date of Patent: Jul. 11, 2006

(54) COOKING APPARATUS WITH COOKING CHAMBER SUPPORT

(75) Inventor: Richard McDuffie, Worcester, MA (US)

(73) Assignee: JCS/THG, LLC, Milford, MA (US)

( * ) Notice: Subject to any disclaimer, the term of this patent is extended or adjusted under 35 U.S.C. 154(b) by 197 days.

(21) Appl. No.: 10/818,914

(22) Filed: Apr. 6, 2004

(65) Prior Publication Data
US 2005/0217662 A1 Oct. 6, 2005

(51) Int. Cl.
A47J 27/00 (2006.01)
A47J 37/12 (2006.01)

(52) U.S. Cl. .................. 219/450; 219/429; 99/403; 99/413; 126/373.1

(58) Field of Classification Search ............. 219/429, 219/430
See application file for complete search history.

(56) References Cited

U.S. PATENT DOCUMENTS

| | | | |
|---|---|---|---|
| 2,097,478 A * | 11/1937 | Struble ..................... 99/412 |
| 2,597,695 A | 5/1952 | Braski et al. |
| 2,682,602 A * | 6/1954 | Huck ..................... 219/433 |
| 2,725,460 A * | 11/1955 | Braski et al. ............. 219/436 |
| 2,753,436 A | 7/1956 | Schwaneke |
| 3,463,077 A | 8/1969 | Lescure |
| 3,801,331 A | 4/1974 | Sano et al. |
| 4,138,606 A | 2/1979 | Brown |
| 4,148,250 A | 4/1979 | Miki et al. |
| 4,462,308 A * | 7/1984 | Wang ..................... 99/413 |
| 4,672,179 A | 6/1987 | Onishi et al. |
| 4,995,312 A | 2/1991 | Leiros |
| 5,029,519 A | 7/1991 | Boyen |
| 5,092,229 A * | 3/1992 | Chen ..................... 99/337 |
| 5,400,700 A * | 3/1995 | Bois ..................... 99/403 |
| 5,524,527 A | 6/1996 | Dumoux et al. |
| 5,567,458 A | 10/1996 | Wu |
| 5,794,522 A | 8/1998 | Bois et al. |
| 6,002,111 A | 12/1999 | Beugnot et al. |
| 6,100,504 A * | 8/2000 | Wagner ................. 219/432 |
| 6,201,217 B1 | 3/2001 | Moon et al. |
| 6,240,837 B1 | 6/2001 | Chang |
| 6,262,398 B1 | 7/2001 | Busquets et al. |
| 6,305,270 B1 | 10/2001 | Wang |
| 6,545,252 B1 | 4/2003 | Wang |
| 6,965,096 B1* | 11/2005 | Wang ..................... 219/429 |
| 2002/0185012 A1 | 12/2002 | Yokoyama |

FOREIGN PATENT DOCUMENTS

| | | |
|---|---|---|
| FR | 2860964 A3 * | 4/2005 |
| JP | 61-18722 | 2/1986 |
| JP | 2-305512 | 12/1990 |
| JP | 4-53508 | 2/1992 |
| JP | 5-21814 | 3/1993 |
| JP | 5-84128 | 4/1993 |

* cited by examiner

Primary Examiner—Joseph Pelham
(74) Attorney, Agent, or Firm—Hoffman & Baron, LLP; Francis E. Marino

(57) ABSTRACT

A cooking apparatus generally includes a housing, a pot supported within the housing and a pot support fixed to a side wall of the pot for supporting the pot within the housing. The housing has an inner side surface and an inwardly extending attachment element disposed on the inner side surface. The pot support is supported on the housing attachment element for supporting the pot within the housing.

17 Claims, 5 Drawing Sheets

COOKING APPARATUS WITH COOKING CHAMBER SUPPORT

FIELD OF THE INVENTION

The present invention relates generally to a cooking apparatus, and more particularly to a deep fryer having a novel structure for supporting the cooking chamber along its side wall leaving the bottom and the top edge of the chamber free from interfering supports.

BACKGROUND OF THE INVENTION

In electric cooking appliances it has been common practice to construct the appliance with a metal cooking vessel or pot positioned within an outer insulating housing. Conventionally, the pot containing the materials to be cooked is usually placed adjacent a hot plate heated by an electric heater and the pot is cooked by means of heat produced from the bottom portion of the pot. Typically, the heater includes heating elements with thermostatic controls for the appliance.

In known cooking apparatus of this type, the inner vessel of the enclosure is made of a metallic material, such that the sheathed resistance in direct contact with the bottom of the removable vessel ensures heating of the latter both by conduction and by radiation after reflection on the bottom of the inner shell of the chamber, which bottom of the inner shell of the chamber constitutes itself a heat reflector.

It is desirable for such a cooking apparatus to maintain the outer insulating housing at a relatively cool temperature so as not to burn a consumer who may touch the housing during use of the apparatus. This can be difficult to achieve given the high temperatures at which the inner metallic cooking vessel is heated and the close proximity between the inner vessel and the outer housing. A number of methods have been proposed with varying success to provide a "cool touch" outer housing to such cooking appliances. These methods include providing a fiberglass insulating blanket around the entire cooking vessel, supporting the vessel at its upper rim with an insulating ring and supporting the vessel so as to provide an insulating air space between the vessel and the outer housing.

Often, the inner metallic cooking vessel of such devices is supported with structure disposed between the bottom of the vessel and the bottom of the outer housing. However, the cooking element of such devices is also typically disposed on the bottom of the inner cooking vessel. As a result, the bottom of the cooking vessel is typically the hottest part of the vessel during operation. Thus, supporting the vessel at its hottest portion raises further insulating concerns.

Additionally, a great deal of difficulty has been experienced with such devices in maintaining an even temperature so that cooking time and results can be standardized. Not only is the hot fat cooled down greatly when loaded with a cold charge of food but the heat recovery is very slow. Also, even when heat loss is recovered or the fryers are operating upon standby service, the temperature of the fat varies over a wide range.

Furthermore, the warm-up period can be quite long and draining the hot fat after use is confronted with many problems, particularly when the vessel is tipped for that purpose. When tipped, hot fat comes in contact with hot metal edges when leaving the vessel, and if any particles or damp crumbs are clinging to the edges, the fat sputters and may cause burns, with accompanying danger of dropping the vessel.

Accordingly, it would be desirable to provide a deep fryer with a cooking chamber support structure that does not interfere with the heating element disposed within the base of the housing so that the heating element may be placed in direct contact with the cooking chamber. As a result, improved even heating of the cooking chamber can be achieved. It would further be desirable to provide a deep fryer with a cooking chamber support structure that isolates the top rim of the cooking chamber from the exterior housing so that less insulation is required and excess heat may be vented.

SUMMARY OF THE INVENTION

The present invention is a cooking apparatus generally including a housing, a pot supported within the housing and a pot support fixed to a side wall of the pot for supporting the pot within the housing. The pot side wall extends upwardly from a bottom of the pot and terminates at a peripheral rim opposite the bottom. The pot support is fixed to the pot side wall at a point below and away from the rim. The housing has an inner side surface and an inwardly extending attachment element disposed on the inner side surface. The pot support is supported on the housing attachment element for supporting the pot within the housing.

Preferably, the pot support comprises a bracket fixed to the pot side wall and a pot fixer attached to the bracket and supported on the housing attachment element. The bracket is preferably made of a metallic material and is welded to the pot side wall and the pot fixer is preferably made of a temperature resistant plastic and is attached to the bracket with a fastener.

In one embodiment, the housing attachment element includes a concavity formed therein and the pot support is cooperatively shaped to be seated within the concavity. In another embodiment, the attachment element includes an inwardly facing side wall and the pot support includes a downwardly directed ridge abutting the side wall for providing positive lateral positioning of the pot. In either embodiment, the pot support is preferably attached to the housing attachment element with a fastener and the housing preferably includes an opening on a bottom surface thereof for permitting access to the fastener.

Preferably, the cooking apparatus further includes a pot side holder disposed adjacent an upper peripheral edge of the housing and a block adjustably connected between the housing and the pot side holder. The pot side holder supports the pot side wall at an upper portion thereof, while the pot support supports the pot side wall at a lower portion thereof. The block adjusts the pot side holder with respect to the pot and prevents the upper portion of the pot from contacting the housing.

In a preferred embodiment, the cooking apparatus is in the form of a deep fryer generally including a housing made from a temperature resistant plastic, an oil pot made from a metallic material, an L-shaped bracket made from a metallic material, a pot fixer made from a temperature resistant plastic and a heating element for providing heat to the pot. The housing has a base and a side wall, each having an interior surface defining an inner housing compartment. The interior surface of the housing side wall further has an inwardly extending attachment element disposed thereon. The oil pot is supported within the inner housing compartment and has a bottom wall and a side wall. The bottom wall and the side wall have an inner surface and an outer surface, wherein the inner surface of the pot defines a cooking chamber for containing a cooking oil. The L-shaped bracket has one leg fixed to the outer surface of the pot side wall at a lower portion thereof and the pot fixer is attached to the other leg of the bracket. The pot fixer is supported on the housing attachment element for supporting the pot within the housing. The heating element is disposed in the housing between the interior surface of the housing base and the outer surface of the pot base, wherein the heating element is in direct contact with the pot base for providing heat to the oil pot.

A preferred form of the cooking apparatus, as well as other embodiments, objects, features and advantages of this invention, will be apparent from the following detailed description of illustrative embodiments thereof, which is to be read in conjunction with the accompanying drawings.

DETAILED DESCRIPTION OF ILLUSTRATIVE EMBODIMENTS

Figure 1:
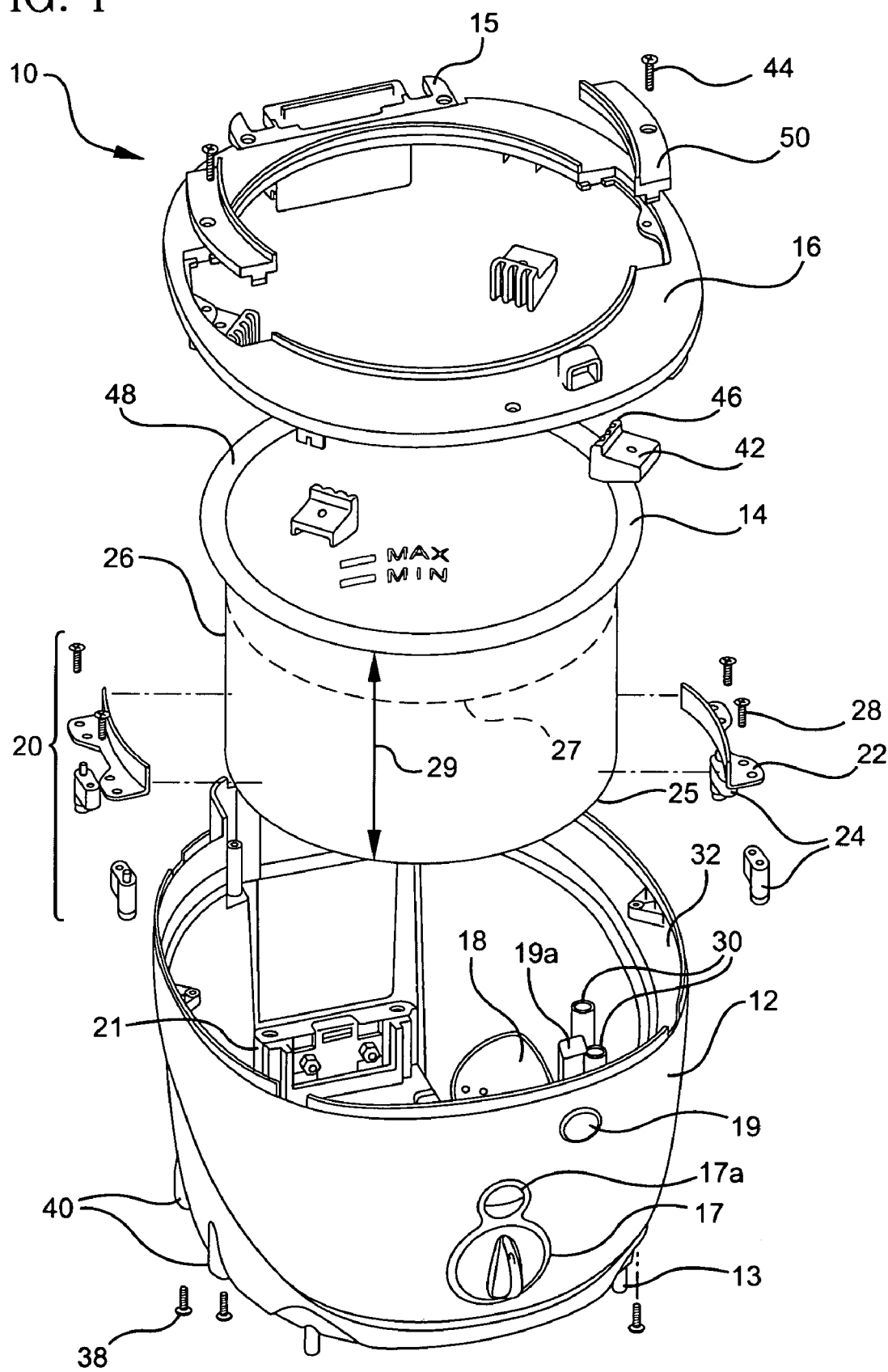
FIG. 1 is an exploded perspective view of the cooking apparatus formed in accordance with the present invention.

The cooking apparatus shown in the drawings is in the form of a deep fryer having an oil pot for containing and heating a cooking oil to a high temperature, wherein the food to be cooked is placed into the cooking oil. However, the present invention is not limited to deep fryers and it is intended to encompass any cooking apparatus having an inner cooking chamber seated within an outer housing.

The cooking apparatus 10, according to the present invention, generally includes an outer housing 12, an inner cooking chamber or pot 14 and a top ring 16. The outer housing 12 and top ring 16 are made of a durable rigid plastic and the inner pot 14 is made of a metallic material and, in the case of a deep fryer, contains oil for frying. A heating element assembly 18 is supported within the bottom of the outer housing 12 for providing heat to the metallic pot 14.

Figure 2:
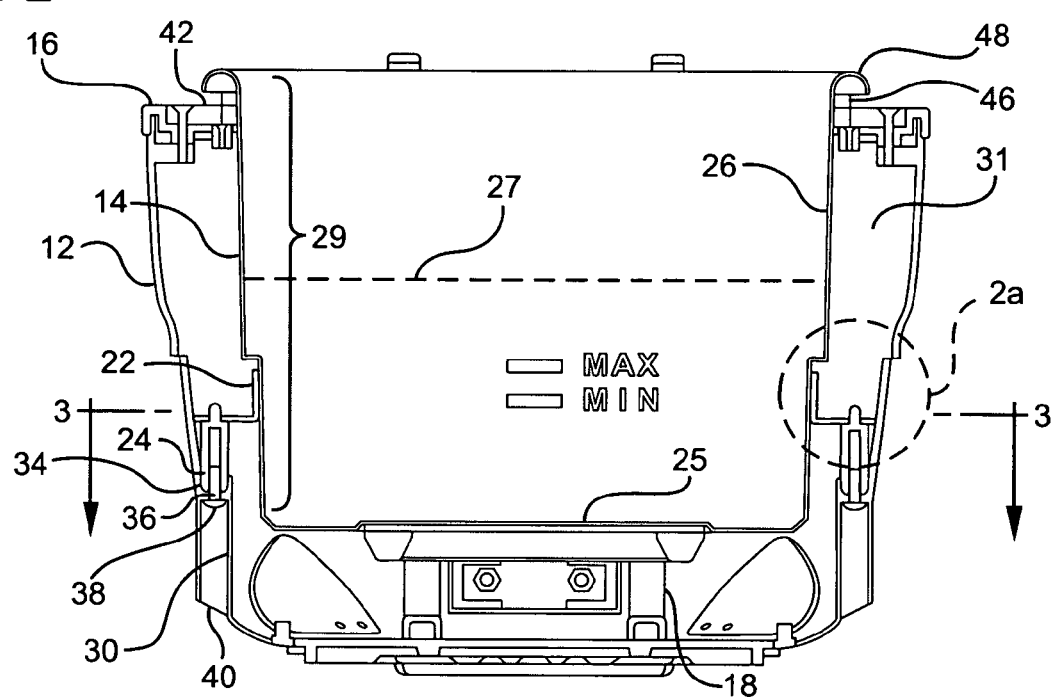
FIG. 2 is a cross-sectional view of the assembled cooking apparatus formed in accordance with the present invention.
Figure 3:
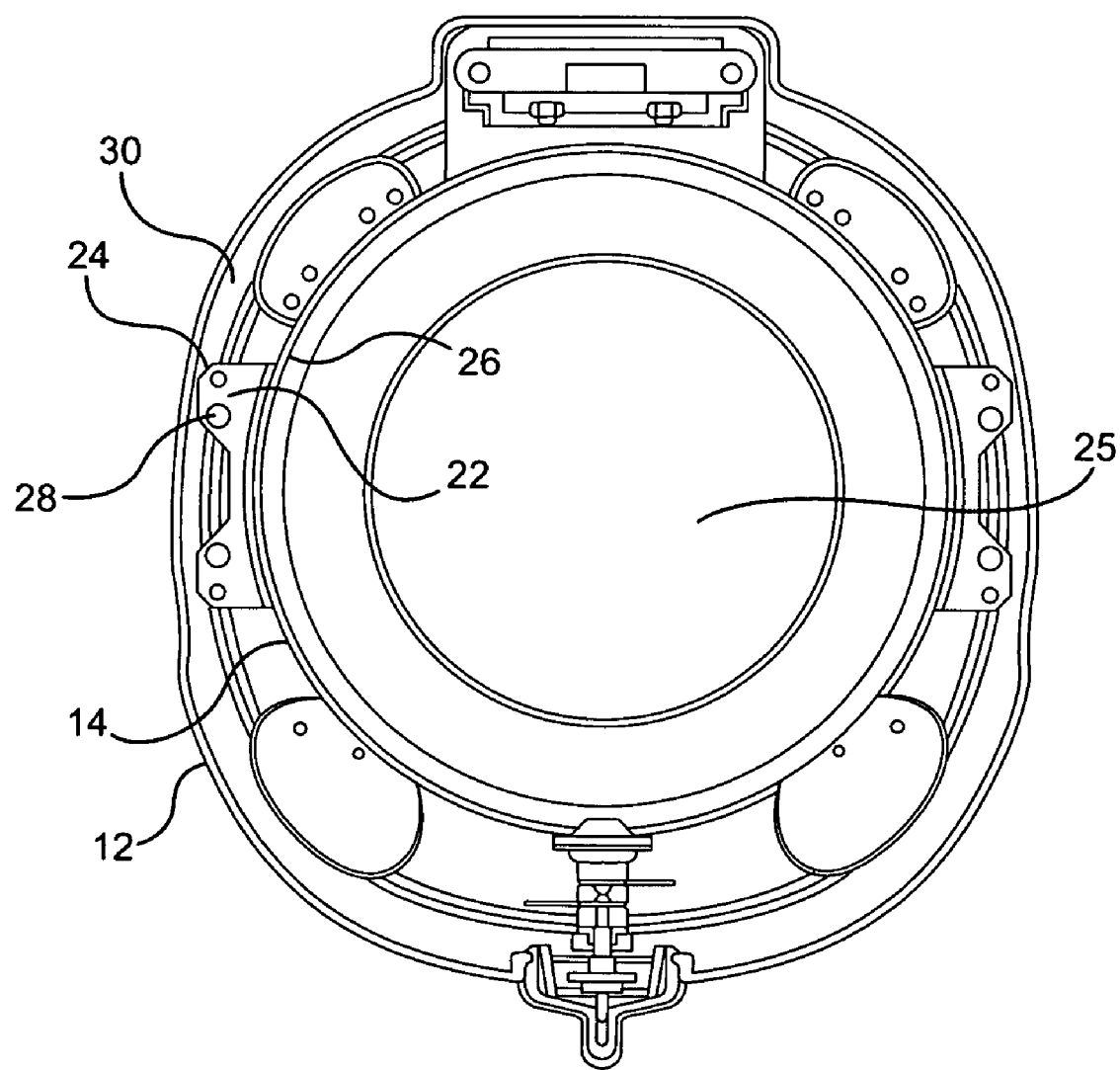
FIG. 3 is a cross-sectional view of the cooking apparatus shown in FIG. 2 taken along the line 3—3.

The outer housing 12 may take any shape. The housing 12 shown in FIGS. 1—3 includes a rounded square-like body having a foot 13 disposed at each corner. The feet 13 are discrete semi-spherical shaped objects extending outwardly from the bottom of the device. The outer housing 12 further includes a lid (not shown) which can be pivotably attached to a hinge 15 provided on the top ring 16. The lid may include a portion having slots to provide for venting. Additionally, the outer housing 12 preferably includes a manually adjustable temperature dial 17 for operating the heating element within the housing, an indicator light 17a for showing when the apparatus is in use and a lid latch mechanism including a lid release button 19 and a lid latch 19a for releasing the lid from engagement with the top ring 16 when the button is pressed. Also, the outer housing 12 is further provided with electrical connections 21 for providing electrical power to the heating element 18 via an external electrical cord (not shown) plugged into a conventional outlet.

To thermally isolate the inner pot 14 from the outer housing 12, and thereby provide the outer housing with a "cool touch" feature, the pot 14 is supported within the outer housing 12 by at least two pot support assemblies 20. The pot support assemblies 20 are generally fixed to a pot side wall 26 at a lower portion thereof. Specifically, the pot 14 includes a bottom 25 and a side wall 26 extending upwardly from the bottom and terminating at a peripheral rim 48 opposite the bottom. The pot support assemblies 20 are fixed to the pot side wall 26 below the rim 48 and at a distance away from the rim. Preferably, the pot supports 20 are fixed to the pot side wall side wall 26 at a point between the midpoint 27 midway along the height 29 of the side wall and the bottom 25 of the pot.

Each pot support assembly 20 preferably includes a pot welding plate 22 and at least one pot fixer 24. The pot welding plate 22 is generally a metallic L-shaped bracket secured to the exterior side surface 26 of the pot 14. Preferably, the pot welding plate 22 is fixed to the inner pot 14 by spot welding one of the legs of the bracket to the middle to lower portion of the exterior side surface 26 of the pot, as described above. The opposite leg of the L-shaped welding plate 22 is secured to at least one pot fixer 24 made of a high temperature resistant plastic. As used herein, the term "high temperature resistant plastic" means a plastic material that can continuously withstand temperatures of up to about 200° C. Such materials include phenolic materials, Bakelite, BMC, PBT and other such thermoset plastics. The bracket 22 may be secured to the fixer 24 with screws 28 or the bracket may be designed with structure enabling it to snap together with the fixer. Preferably, each pot support assembly 20 includes two pot fixers 24 for additional stability.

Figure 2A:
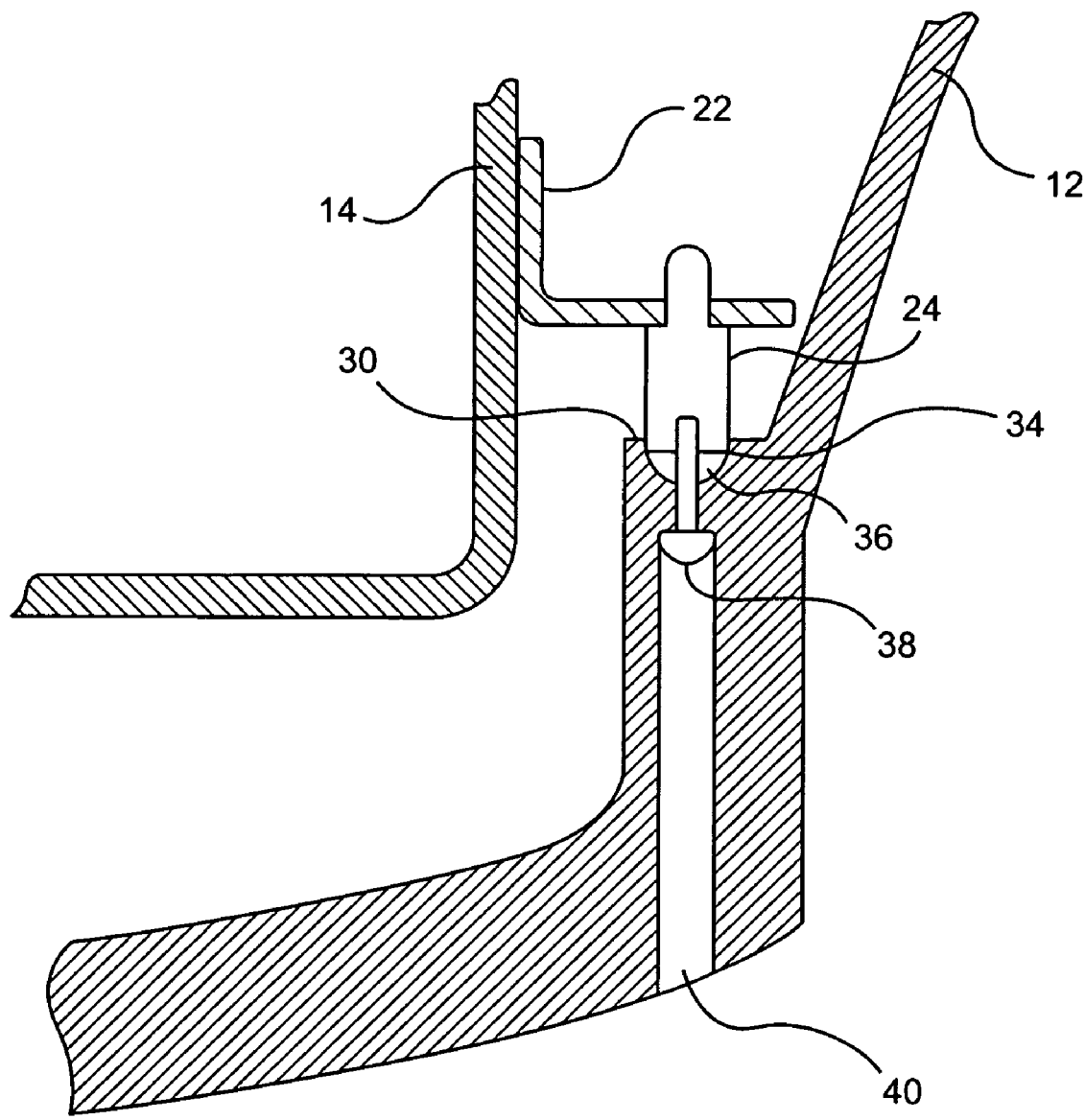
FIG. 2a is an enlarged cross-sectional view of the cooking chamber support shown in FIG. 2.

Once assembled to the inner pot 14, the pot supports 20 engage structure formed within the interior of the outer housing 12 to maintain the inner pot in a stable upright orientation. Specifically, in a preferred embodiment, the pot fixers 24 are shaped to be received within one or more inwardly extending attachment elements 30 formed on an inner side wall surface 32 of the outer housing 12. The attachment elements 30 are preferably integrally molded portions of the inner side wall surface 32 of the outer housing 12 and may be discrete individual elements for receiving a respective pot fixer 24 or they may be in the form of a shelf or a ledge for attaching more than one pot fixer thereto. As further shown in FIGS. 2 and 2a, the pot fixer 24 has a rounded bottom 34 which is cooperatively seated within a concavity 36 formed in the attachment element 30. Thus, during manufacturing of the cooking apparatus 10 of the present invention, the pot 14 and pot support assemblies 20 can be pre-assembled and the pot can be inserted within the outer housing 12, whereby the pot fixers 24 serve as locating guides for orienting the pot within the housing. Preferably, the pot fixers 24 are secured to the outer housing 12 by screws 38, which can be inserted and fastened to the fixers via an opening 40 formed in the bottom of the outer housing and communicating with the attachment elements 30 of the housing.

The pot 14 may further be secured within the outer housing 12 by a plurality of pot side holders 42 spaced equally around the periphery of the pot rim 48. The pot side holders 42 are also made of a high temperature resistance plastic so as to insulate the heated pot 14 from the outer housing 12. The pot side holders 42 are preferably secured to the top ring 16 of the cooking apparatus by screws 44 and the top ring may be secured to structure formed on the upper peripheral edge of the outer housing. The pot side holders 42 are generally L-shaped members having a lip 46 which engages the upper portion of the pot side wall 26 and which can be disposed within the underside of a rim 48 formed on the upper peripheral portion of the pot 14. Preferably, the top ring 16 includes a top ring block 50, which allows for slight adjustment of the pot side holders 42 to securely lock the pot 14 within the outer housing 12, whereby the top edge 48 of the pot does not directly contact the housing.

Figure 4:
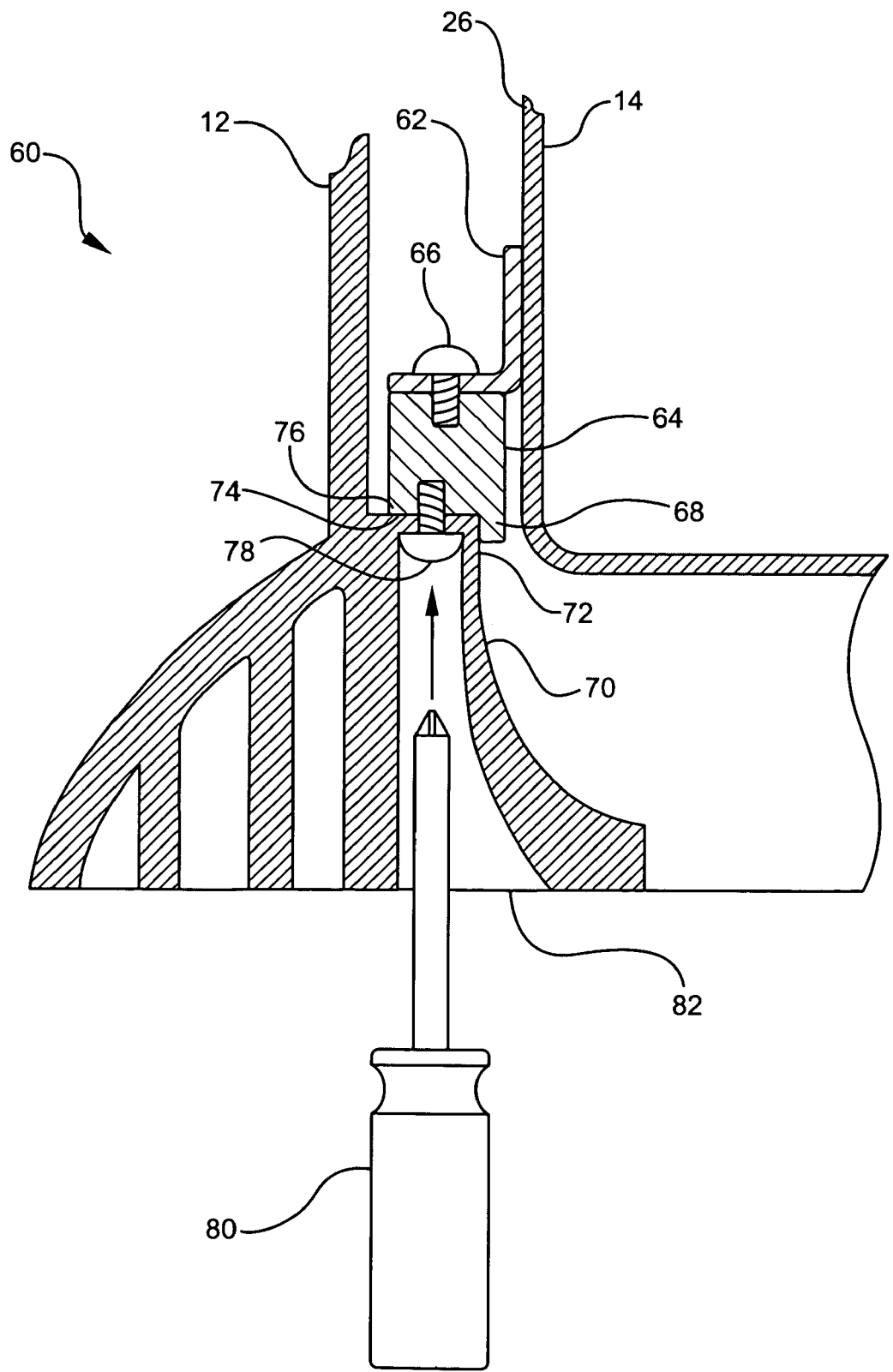
FIG. 4 is an enlarged cross-sectional view of an alternative embodiment of a cooking chamber support.

FIG. 4 is an enlarged cross-sectional view of an alternative embodiment of a pot support assembly 60 for supporting the pot 14 within the outer housing 12. Similar to the pot support assemblies 20 described above, each pot support assembly 60 of the alternative embodiment includes a pot welding plate 62 and at least one pot fixer 64. Again, the pot welding plate 62 is generally an L-shaped bracket secured to the exterior side surface 26 of the pot 14. Preferably, the pot welding plate 62 is fixed to the inner pot 14 by spot welding one of the legs of the bracket to the middle to lower portion of the exterior side surface 26 of the pot. The opposite leg of the L-shaped welding plate 62 is secured to at least one pot fixer 64 made of low temperature resistant plastic. The bracket 62 may be secured to the fixer 64 with screws 66. Preferably, each pot support assembly 60 includes two pot fixers 64 for additional stability.

However, unlike the pot fixers 24 described above, the pot fixer 64 shown in FIG. 4 includes a ridge 68 formed on an interior side thereof, which engages an inwardly facing circumferential ledge 70 formed within the interior of the outer housing 12 to support the inner pot in a stable upright orientation. In particular, the ridges 68 formed on the pot fixers 64 are shaped to abut against an inwardly facing side surface 72 the ledge 70 of the outer housing 12, while the bottom surface 74 of the fixer rests upon a top surface 76 of the ledge. Thus, the pot 14 and pot support assemblies 60 can be pre-assembled and the pot can be inserted within the outer housing 12, whereby the pot fixers 64 serve as locating guides for orienting the pot within the housing. Again, the pot fixers 64 are secured to the outer housing 12 by screws 78, which are accessible with a screwdriver 80 via an opening 82 formed in the bottom of the outer housing and communicating with the ledge 70 of the housing.

As a result of the present invention, the pot 14 is supported exclusively on its side wall 26 and an air space 31 is provided between the pot and the outer housing 12 to thermally isolate the outer housing from the pot. Specifically, at its top portion, the pot 14 is supported by the high temperature resistant pot side holders 42 and, at its bottom portion, the pot is supported by the pot support assemblies 20 and 60, which include high temperature resistant pot fixers 24 and 64. In both embodiments of the invention, the pot fixers 24 and 64 sit upon a shelf 30 or a ledge 70, which extends inwardly from the inner sidewall 32 of the outer housing 12 and a thermally insulating air space 31 is thereby formed between the pot and the outer housing. The thermally insulating airspace 31 means less insulation is required and excess heat can be vented. Thus, the outer housing is provided with a "cool touch" feature and there is no structure which supports the inner pot 14 between the bottom of the pot and the bottom of the housing that may interfere with the heating element 18 positioned within the base of the outer housing 12.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A cooking apparatus comprising:
   a housing having an inner side surface and an inwardly extending attachment element disposed on said inner side surface;
   a pot supported within said housing, said pot having a bottom and a side wall extending upwardly from said bottom and terminating at a peripheral rim opposite said bottom; and
   a pot support fixed to said pot side wall below said rim, said pot support being supported on said housing attachment element for supporting said pot within said housing,
   wherein said pot side wall has a height and a midpoint disposed midway along said height, said pot support being fixed to said pot side wall between said bottom of said pot and said midpoint.

2. A cooking apparatus comprising:
   a housing having an inner side surface and an inwardly extending attachment element disposed on said inner side surface;
   a pot supported within said housing, said pot having a bottom and a side wall extending upwardly from said bottom and terminating at a peripheral rim opposite said bottom; and
   a pot support fixed to said pot side wall below said rim, said pot support being supported on said housing attachment element for supporting said pot within said housing and including a bracket fixed to said pot side wall and a pot fixer attached to said bracket and supported on said housing attachment element, wherein said bracket is made of a metallic material and is welded to said pot side wall and said pot fixer is made of a high temperature resistant plastic and is attached to said bracket with a fastener.

3. A cooking apparatus comprising:
   a housing having an inner side surface and an inwardly extending attachment element disposed on said inner side surface;
   a pot supported within said housing, said pot having a bottom and a side wall extending upwardly from said bottom and terminating at a peripheral rim opposite said bottom; and
   a pot support fixed to said pot side wall below said rim, said pot support being supported on said housing attachment element for supporting said pot within said housing,
   wherein said housing attachment element includes a concavity formed therein and said pot support is cooperatively shaped to be seated within said concavity for providing positive lateral positioning of said pot.

4. A cooking apparatus comprising:
   a housing having an inner side surface and an inwardly extending attachment element disposed on said inner side surface;
   a pot supported within said housing, said pot having a bottom and a side wall extending upwardly from said bottom and terminating at a peripheral rim opposite said bottom; and
   a pot support fixed to said pot side wall below said rim, said pot support being supported on said housing attachment element for supporting said pot within said housing, wherein said pot support is attached to said housing attachment element with a fastener and wherein said housing includes an opening on a bottom surface thereof for permitting access to said fastener.

5. A cooking apparatus comprising:
a housing having an inner side surface and an inwardly extending attachment element disposed on said inner side surface;
a pot supported within said housing, said pot having a bottom and a side wall extending upwardly from said bottom and terminating at a peripheral rim opposite said bottom; and
a pot support fixed to said pot side wall below said rim, said pot support being supported on said housing attachment element for supporting said pot within said housing,
wherein said housing attachment element includes an inwardly facing side wall and said pot support includes a downwardly directed ridge abutting said side wall for providing positive lateral positioning of said pot.

6. A cooking apparatus comprising:
a housing having an inner side surface and an inwardly extending attachment element disposed on said inner side surface;
a pot supported within said housing, said pot having a bottom and a side wall extending upwardly from said bottom and terminating at a peripheral rim opposite said bottom;
a pot support fixed to said pot side wall below said rim, said pot support being supported on said housing attachment element for supporting said pot within said housing; and
a pot side holder disposed adjacent an upper peripheral edge of said housing, said pot side holder supporting said pot side wall at an upper portion thereof and said pot support supporting said pot side wall at a lower portion thereof.

7. A cooking apparatus as defined in claim 6, further comprising a block adjustably connected between said housing and said pot side holder for adjusting said pot side holder with respect to said pot.

8. A cooking apparatus as defined in claim 6, wherein said pot side holder prevents said upper portion of said pot from contacting said housing.

9. A deep fryer comprising:
a housing made from a plastic and having a base and a side wall, said base and said side wall having an interior surface defining an inner housing compartment and said interior surface of said side wall further having an inwardly extending attachment element disposed thereon;
an oil pot made from a metallic material and supported within said inner housing compartment, said oil pot having a bottom wall and a side wall, said bottom wall and said side wall having an inner surface and an outer surface, said inner surface of said pot defining a cooking chamber for containing a cooking oil;
an L-shaped bracket made from a metallic material and having one leg fixed to said outer surface of said pot side wall at a lower portion thereof;
a pot fixer made from a high temperature resistant plastic attached to said L-shaped bracket and supported on said housing attachment element for supporting said oil pot within said housing; and
a heating element disposed in said housing between said interior surface of said housing base and said outer surface of said pot base, wherein said heating element is in direct contact with said pot base for providing heat to said pot.

10. A deep fryer as defined in claim 9, wherein said housing attachment element includes a concavity formed therein and said pot support is cooperatively shaped to be seated within said concavity.

11. A deep fryer as defined in claim 9, wherein said L-shaped bracket is welded to said outer surface of said pot side wall.

12. A deep fryer as defined in claim 9, wherein said pot fixer is attached to said housing attachment element with a fastener.

13. A deep fryer as defined in claim 12, wherein said housing includes an opening in said base for permitting access to said fastener.

14. A deep fryer as defined in claim 9, wherein said housing attachment element includes an inwardly facing side wall and said pot fixer includes a downwardly directed ridge abutting said side wall for providing positive lateral positioning of said pot.

15. A deep fryer as defined in claim 9, further comprising a pot side holder disposed adjacent an upper peripheral edge of said housing, said pot side holder supporting said outer surface of said pot side wall at an upper portion thereof.

16. A deep fryer as defined in claim 15, further comprising a block adjustably connected between said housing and said pot side holder for adjusting said pot side holder with respect to said pot.

17. A deep fryer as defined in claim 15, wherein said pot side holder prevents said upper portion of said pot from contacting said housing.

\* \* \* \* \*